United States Patent [19]
Sheets et al.

[11] Patent Number: 5,437,023
[45] Date of Patent: Jul. 25, 1995

[54] NOISE-TOLERANT ADDRESS TRANSMISSION SYSTEM FOR DIGITAL TELECOMMUNICATION NETWORK

[75] Inventors: Laurence L. Sheets, Woodridge; Guy C. Cerulli, Bolingbrook, both of Ill.

[73] Assignee: Teltrend, Inc., St. Charles, Ill.

[21] Appl. No.: 193,946

[22] Filed: Feb. 9, 1994

[51] Int. Cl.⁶ .............................................. G06F 11/00
[52] U.S. Cl. .................... 395/575; 371/20.5; 379/5
[58] Field of Search ............... 395/575, 200; 371/20.2, 371/20.5, 20.6; 375/3.1, 3, 10; 379/5, 18

[56] References Cited
U.S. PATENT DOCUMENTS
5,058,163 10/1991 Lubarsky et al. .................. 380/49
5,191,326 3/1993 Montgomery ................... 340/855.5

*Primary Examiner*—Vincent P. Canney
*Attorney, Agent, or Firm*—Banner & Allegretti, Ltd.

[57] ABSTRACT

An improved address acknowledgement system for line elements such as repeaters in a digital telecommunication network. The system is preferably controlled by logic circuitry, in conjunction with a microprocessor. A remote facility such as a test unit transmits to the repeater a loopup command, requesting the repeater to enter loopback mode. The repeater acknowledges receipt of this command by inverting its address and transmitting the inverted address back to the test set. The test set either scans its incoming data stream for the inverted address of the line element or inverts the incoming data stream and scans the inverted incoming data stream for the non-inverted address of the line element. In either case, another line element bearing the same non-inverted address as the line element targeted to enter loopback will not interpret the inverted address as a loopup command. Accordingly, other line elements will not thereby be unintentionally caused to enter loopback mode.

21 Claims, 5 Drawing Sheets

NOISE-TOLERANT ADDRESS TRANSMISSION SYSTEM FOR DIGITAL TELECOMMUNICATION NETWORK

BACKGROUND OF THE INVENTION

The present invention relates generally to remote reporting systems for line elements in a digital transmission network. More particularly, the present invention relates to a system for enabling a line element, such as a regenerative repeater, that is interconnected to a transmission line in a digital transmission network to efficiently communicate its address to a remote location that is also interconnected to a transmission line in the network, without affecting the status of other line elements. This invention may, for example, assist a telephone company technician in identifying, from a test location, the location of a particular repeater, in a string of repeaters, that is malfunctioning.

The present invention may be used with digital transmission line networks generally, including, for example, the Regional Bell Telephone Systems in the United States. A general description of such a network is provided in U.S. patent application Ser. No. 07/943,859, filed on Sep. 11, 1992 by Pesetski et al. ("Pesetski"), for a remote reporting system for digital transmission line elements.

As Pesetski notes, the data, or "payload," signals on digital transmission lines are typically sent differentially on a Tip-Ring pair. Payload signals are received by equipment at the telephone company central office and, generally, are transmitted, via cables, to a series of regenerative signal repeaters, and ultimately to customer premises equipment. Such repeaters are spaced along the cables approximately every 6,000 feet. Each length of approximately 6,000 feet of cable may be designated as a "span."

The first repeater receives the data from the central office, but, because of transmission line losses, noise, interference, and distortion, the signal will have degenerated. Therefore, the repeater recognizes the presence or absence of a pulse at a particular point in time and, thereafter, if appropriate, regenerates, or "builds up," a clean, new pulse. The first line repeater (or "signal repeater" or "regenerative repeater") sends the regenerated, or repeated, signal to the next line repeater, stationed approximately one mile away, and so forth, until the signal reaches its destination.

The Bell Telephone System has widely utilized time multiplexed pulse code modulation systems. Such systems have generally been designated as "T carriers." The first generation of multiplexers designed to feed the T1 system was the D1 channel bank. Channel banks have evolved through the D5 series. The "D" channel bank provides multiple DS-1 signals that are carried on the T1 systems. Each T1 system carries twenty-four two-way channels on two pairs of exchange grade cables. One pair of cables provides communication in each direction.

For convenience and simplification of terminology, the pair of cables carrying signals from the central office to the customer premises equipment may be referred to as a "transmit" line, and the pair of cables transmitting data from the customer premises equipment to the central office may be referred to as a "receive" line. These designations are made only as a matter of convenience; when an observer (such as a testing technician) changes position from a central office to the customer premises, what used to be a "transmit" line becomes a "receive" line, and what used to be a "receive" line becomes a "transmit" line.

As further indicated by Pesetski, the data to be transmitted over the cables, such as speech, may be sampled at a rate of 8,000 hertz, and the amplitude of each signal is measured. The amplitude of each sample is compared to a scale of discrete values and assigned a numeric value. Each discrete value is then encoded into a binary form. Representative binary pulses appear on the transmission lines. The binary form of each sample pulse consists of a combination of eight pulses, or bits. The eighth bit is robbed every sixth frame (or 750 microseconds) to allow for signaling.

A coding system is typically used to convert the analog signal to a digital signal. The system guarantees some desired properties of the signal, regardless of the pattern to be transmitted. The most prevalent code in the United States is bipolar coding with an all zero limitation (also called "AMI" for Alternative Mark Inversion). With bipolar coding, alternate "ones" are transmitted as alternating positive and negative pulses, assuring a direct current balance and avoiding base-line wander. Further, an average density of one pulse in eight slots, with a maximum of fifteen zeros between "ones," is required. This is readily obtained in voiceband coding, however, by simply not utilizing an all-zero word.

In many telecommunication systems, data may be transmitted sequentially in discrete groups of bits called "frames." In the T1 system, for instance, all twenty-four channels are sampled every 125 microseconds (equivalent to 1/8,000 of a second), constituting one frame. A synchronizing bit, or "frame bit", is added to each frame to serve as a flag, enabling line elements to distinguish each frame from the preceding frame or from noise on the line. Since there are eight bits per channel and there are twenty-four channels, and there is one frame bit at the end of each frame, the total number of "bits" needed per frame is 193. Thus, the resulting line bit rate for T1 systems is 1.544 million bits per second.

Signals that violate either the coding rules or the framing rules established in a particular system are detected as errors. Thus, for example, under a bipolar coding scheme, two positive pulses should never occur in sequence. To the extent such pulses do occur adjacent to each other (as detected, for instance, by a test set applied to the digital transmission cables), such a signal may be noted as a bipolar coding violation. Similarly, as described in U.S. patent application Ser. No. 08/152,724, filed on Nov. 15, 1993 by Bergstrom et al. ("Bergstrom"), a digital signal that violates framing rules (such as framing bit requirements) established in a given system is detected as "frame error." In a given encoding protocol, a sufficient number of frame errors may be detected as a frame loss.

In a telecommunications network, signals generally pass from customer premises equipment, through at least one central switching station, and on to other customer premises equipment. Thus, in a telecommunication network such as the Bell Telephone System, equipment at the central office may serve as a hub to a plurality of transmission line branches, each of which connects equipment at given customer premises to the central office. Each transmission line branch comprises a series of line elements (such as regenerative repeaters) interconnected to one another by spans of cables comprising both transmit and receive lines. Along a given branch, every line element is identified by a unique address, which may take the form of a 16-bit binary code, to distinguish each line element from the others. However, it is known that in some systems, a line element on a first branch connected to the central office may have the same address as a line element on a second branch connected to the central office.

As Pesetski notes, there may be many miles of cable between the central office and a given customer premises, with a large number of repeaters along the branch between the two facilities. Thus, if the malfunction of a transmission line is detected during a test (or simply during normal operation), it is important to make an accurate determination of the location of the fault. In this way, the fault may be located and corrected more quickly and inexpensively.

One method of determining the location of a fault along a digital transmission line branch is by selectively placing line elements along the branch in "logical loopback mode." The unique addresses of the line elements along each branch facilitate this selective "sectionalization," as discussed more fully below.

The use of loopback to determine the location of a fault along a digital transmission line is disclosed, for instance, in U.S. Pat. No. 5,224,149, by Garcia (assigned to the assignee of the present invention). As Garcia explains, an activating signal may be sent by the test set located, for instance, in the central office. This activating signal is frequently referred to as a "loopup" code, because it is intended to cause a line element to enter loopback mode. The activating signal may designate a first repeater to "loopback" the signal from the transmit line to the receive line. Accordingly, a signal sent down the transmit line should then be received immediately thereafter at the receive line in the central office, if the lines to and from the repeater are continuous and the repeater has performed a loopback between the transmit and receive lines.

Should continuity between the test set and the first repeater thereby be proven, the test set may then instruct the first repeater to connect the lines in standard transmission mode and instruct the next most proximate repeater to loopback signals. Thereafter, if the test signal applied to the transmit line is not then also received at the receive line, the telephone company technician will know that the malfunction has occurred between the loopback of the first repeater and the loopback of the second repeater. The error in the line will thereby be sectionalized to a 6,000 foot interval rather than the entire length of the transmission line.

Notably, logical loopback may occur toward either the central office or the customer premises equipment. As suggested above, when loopback occurs toward the customer premises equipment, the arbitrary designations of "transmit line" and "receive line" are reversed.

In summary, when a line element such as a repeater is placed in loopback mode, it receives data on the transmit line (from the direction of the test set) and loops the data back onto the receive line (toward the test set), rather than building-up and passing the data along the transmit line to the next line element. Typically, while in loopback, a line element will generate a "loopback indication signal" (or "LIS") along the (outgoing) transmit line, to indicate its loopback status. A loopback indication signal may generally comprise a continuous string of logical "1" bits.

In order for a test set to place a selected line element in loopback mode, it is necessary to establish communication between the test set and the line element. In some systems, a supplemental transmission line (in addition to the transmit and receive lines) is installed for carrying such control or "maintenance" signals from one location to another along the network transmission lines. In other systems, as disclosed by Pesetski and Bergstrom, for instance, maintenance signals may be carried within the continuous stream of data in the existing transmission lines in the form of intentionally generated bit (coding) errors or frame losses in the transmitted data.

As indicated in Bergstrom, however, it has been determined that intense noise in the form of "dribbling" bit errors along the transmission lines may, under extreme conditions, render communication, via bit errors, more difficult to accomplish. Further, communication through the transmission of frame losses necessarily requires the exacting synchronization and control of framing in the transmitted data.

In other systems, in order to provide maintenance communication between the test set and a selected line element, the test set first arms the line elements along the branch (by transmitting an arm signal) and then transmits a loopup code directed to the selected line element. The selected line element receives the loopup code and responds by first sending a confirmation signal to the test set and then entering loopback mode.

In one system, for instance, a test set connected to a line element or central office begins by transmitting along the transmit line five seconds of an "arm" code, to notify the line elements along the transmit line that one of those line elements may be requested to enter loopback. Next, the test set transmits three seconds of a loopup code, in order to command the selected line element to enter loopback mode.

Generally, the loopup code transmitted by the test set may comprise the address of the selected line element. However, in order to avoid unintended loopup, it is important for the selected line element to ensure that its address, rather than noise, is in fact being transmitted by the test set. Therefore, during the three seconds, a loopup code is transmitted repeatedly within a fixed bit order, and the selected line element continues to look for a matching code.

For example, assuming the use of 4-bit line element addresses, the test set may send the 4-bit address of the selected line element, repeated for three seconds. If the address of the selected line element is 1011, for instance, the repeatedly transmitted pattern would therefore appear as follows:

1011101110111011 . . . 10111011 time=5 seconds

In turn, a detector in the selected line element analyzes the transmitted data stream in search of the matching pattern, 1011.

Importantly, in a repeated pattern like that shown above, more than one 4-bit pattern is repeated, depending on the point in the data stream at which the detector begins analyzing the data. In the above example, for instance, the detector might not start looking at the incoming data until the second bit is received. In this scenario, the data stream seen by the detector would appear as follows:

011101110111011 ... 101110111 time = 5 seconds

To the detector, this pattern may therefore appear to be the 4-bit code 0111 repeated continuously. However, the detector must also recognize that this pattern is 1011 repeated continuously as well. In this respect, the 4-bit code 1011 is the same as the 4-bit code 0111 "rotated."

Where a binary word can be transformed into a different binary word simply by rotating one of the words, the two binary words are said not to be "unique under rotation" with respect to each other. Therefore, the 4-bit codes 1011 and 0111 are not unique under rotation with respect to each other. Conversely, the binary words 1011 and 1001, for instance, are unique under rotation with respect to each other, because, regardless of the number of times the word 1011 is rotated, the word 1001 will never result. Thus, for example, considering all possible 4-bit word combinations and their rotations, the following table indicates which codes are unique under rotation with respect to the others.

| Code and N-1 Rotations | Decimal Value | Equivalent (Decimal Value) Number | Unique Under Rotation |
| --- | --- | --- | --- |
| 0000 → 0000 → 0000 → 0000 | 0 | 0 | * |
| 0001 → 0010 → 0100 → 1000 | 1 | 1 | * |
| 0010 → 0100 → 1000 → 0001 | 2 | 1 | |
| 0011 → 0110 → 1100 → 1001 | 3 | 3 | * |
| 0100 → 1000 → 0001 → 0010 | 4 | 1 | |
| 0101 → 1010 → 0101 → 1010 | 5 | 5 | * |
| 0110 → 1100 → 1001 → 0011 | 6 | 3 | |
| 0111 → 1110 → 1101 → 1011 | 7 | 7 | * |
| 1000 → 0001 → 0010 → 0100 | 8 | 1 | |
| 1001 → 0011 → 0110 → 1100 | 9 | 3 | |
| 1010 → 0101 → 1010 → 0101 | 10 | 5 | |
| 1011 → 0111 → 1110 → 1101 | 11 | 7 | |
| 1100 → 1001 → 0011 → 0110 | 12 | 3 | |
| 1101 → 1011 → 0111 → 1110 | 13 | 7 | |
| 1110 → 1101 → 1011 → 0111 | 14 | 7 | |
| 1111 → 1111 → 1111 → 1111 | 15 | 15 | * |

In order to ensure that only the address of the selected line element is transmitted as a loopup code by the test set, the system must ensure that no rotated version of the selected line element corresponds to the address of another line element on the transmit line. Therefore, each of the line elements along a given transmit line must be defined by a binary address that is unique under rotation with respect to the addresses of the other line elements along the transmit line. In this way, of the line elements along a given transmit line, only the selected line element will detect the loopup code.

Once the selected line element assuredly detects its address in the incoming data stream (along the transmit line), the selected line element sends an acknowledgement signal (along the receive line) back to the test set to indicate that it is about to enter loopback. The acknowledgement signal may comprise, for instance, two seconds of the same address code just sent by the test set. After these two seconds of an acknowledgement code, the selected line element enters loopback mode, looping back data from the transmit line to the receive line.

To generally summarize, in order to detect the location of a fault downstream from a test position on a given transmission branch, a technician may connect a test set to the test position and configure the test set to cause a selected line element on the branch to enter loopback mode. To do so, in part, the test set may transmit along the transmit line the 16-bit address of the selected line element. The selected line element may in turn acknowledge that it will enter loopback mode, by transmitting its 16-bit address back to the test set.

Unfortunately, as noted above, it is possible that a line element on one branch connected to a central hub may bear the same 16-bit address as a line element on another branch connected to the hub. Thus, when the selected line element transmits its address (as an acknowledgement code) back to the test set, it is possible that the transmitted address may continue along the transmission lines past the test set, through the hub, and down another branch to the other line element that possesses the identical address. As an undesired result, if the other line element is armed, it may interpret the transmission of "its" address as a loopup code, and it may accordingly enter loopback as well.

Disadvantageously, when two line elements are simultaneously in loopback mode, communication difficulties may arise. As an example, a test set positioned at the central office may cause a first repeater on a first branch to loop data back to the test set. Simultaneously, the acknowledgement signal sent from the first repeater to the test set may pass to a second branch and cause a second repeater (on the second branch) to loop data back to the test set. Both repeaters in loopback would thus be sending loopback indication signals along their respective transmit lines to their respective customer premises equipment. Accordingly, both customer premises equipment at the end of the first branch and at the end of the second branch would simultaneously be receiving a loopback indication signal. In such a case, a test set at the end of either branch would be unable to signal either repeater to leave the loopback mode.

The presently available apparatus and methods for preventing such an undesired result involve the installation of blocking circuitry in the central office, the transmission of maintenance signals on a supplemental wire, or the transmission of maintenance signals in the form of bit errors or frame losses. However, as suggested in part above, these existing solutions suffer from one or more drawbacks. Installation of blocking circuitry or transmission on supplemental wires, for instance, may be both cumbersome and expensive. Transmission of maintenance signals in the form of frame losses may require the installation of synchronizing circuitry to ensure proper control of framing. Finally, transmission of maintenance signals in the form of bit errors may be difficult to accomplish where substantial noise (in the form of dribbling bit errors, for instance) exists along the transmission lines. A need therefore exists for a communication system in which a digital transmission line element can acknowledge its receipt of a loopup command without unintentionally causing other line elements to enter loopback as well.

SUMMARY OF THE INVENTION

In a principle aspect, the present invention comprises a system for enabling a line element to acknowledge its receipt of a command (such as a command to enter loopback), while not thereby affecting the status of other line elements by unintentionally causing other line elements to, for example, also enter loopback. The present invention utilizes a "complement property" of codes that are unique under rotation. With the system of number selection employed with the present invention, the complement property provides that if a given code is "unique under rotation", then its complement (or "inverse") is also "unique under rotation." Thus, with the present invention, for any given line element address, both the line element address and the complement of its address must be unique (not the same as any other line element's address) under rotation.

The present invention makes use of codes that are both unique under rotation and have complements that are unique under rotation with respect to other line element addresses. More particularly, the present invention contemplates the addition of an inversion function to the control system of the line element. Instead of transmitting its address in the outgoing data stream, the line element may thus transmit an inverted version of its address for receipt by a test set. The test set is configured to detect and interpret the inverted address, or to invert the inverted signal received, and to thereby determine whether the appropriate line element is responding.

Thus, the line element does not transmit toward the test set a non-inverted version of its own address, but rather transmits an inverted version of its own address. As a result, other line elements bearing the same address as the transmitting line element will not detect the address in their incoming data streams, and will not be caused to enter loopback.

Accordingly, a principle object of the present invention is an improved system for transmitting a unique acknowledgement code from a first line element to another line element or remote facility such as a test set in a central office. Another object of the invention is a repeater than may more efficiently communicate with a remote location with less need for modification of the repeater, with less need for the use of specialized circuitry to decode the signal generated by the repeater, and without unintentionally causing a change in status of other line elements in the digital telecommunications network.

Still another object of the invention is an improved repeater having a control system for enabling more efficient communication of maintenance information between a remote line element and another line element or test facility. Yet another object of the invention is an improved repeater having an inverter or inversion function for enabling communication of an address without affecting the status of other line elements. These and other objects, features, and advantages of the present invention are discussed or apparent in the following detailed description.

BRIEF DESCRIPTION OF THE DRAWINGS

A preferred embodiment of the present invention is described herein with reference to the drawing wherein.

DETAILED DESCRIPTION OF THE PREFERRED EMBODIMENT

Figure 1:
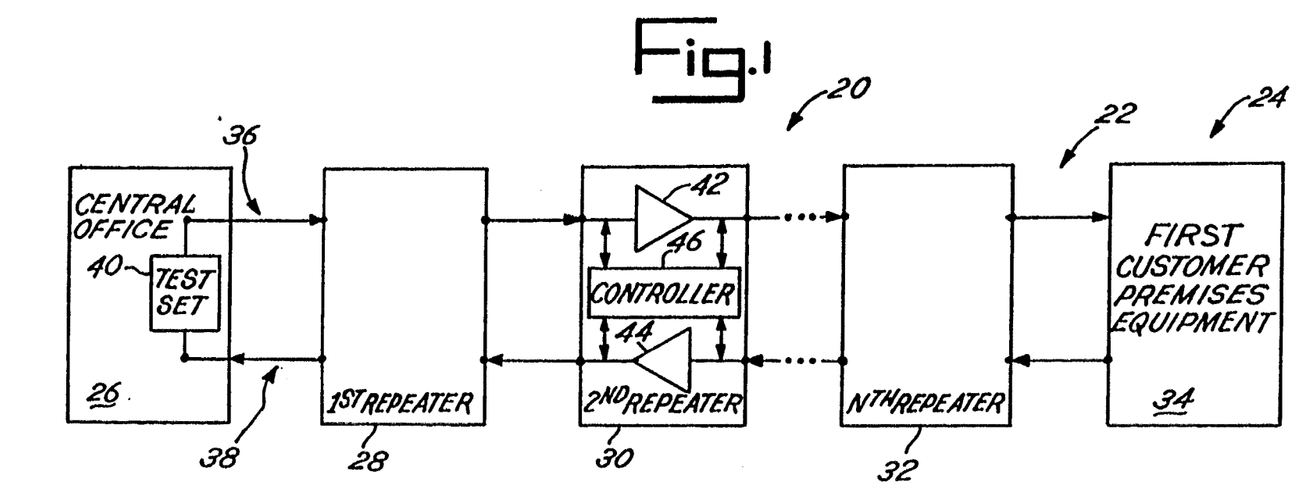
FIG. 1 is a block diagram of a controller that employs the present invention and that is implemented in a line repeater interconnected to digital transmission lines.

Referring to FIGS. 1-5, a preferred embodiment of the present invention is shown as a noise-tolerant address transmission system 20 for digital transmission lines 22. As shown in FIG. 1, and as generally described in Pesetski (U.S. patent application Ser. No. 07/943,859), existing digital transmission facilities 24 include, in addition to the lines 22, a central office 26, a plurality of line repeaters (designated as a first line repeater 28, a second line repeater 30 and an "Nth" line repeater 32), and first customer premises equipment 34. The digital transmission lines 22 include first and second pairs of exchange grade transmission cables 36, 38 interconnecting the central office 26, line repeaters 28-32, and first customer premises equipment 34.

Cables 36 may be designated as a "transmit" line, and cables 38 may be designated as a "receive" line. However, these designations of "transmit" and "receive" lines are arbitrary and labeled as such only for convenience. A "transmit" line would become a "receive" line if an observer merely changes position.

As stated in the Pesetski application, the central office 26 may include test equipment, such as a test set 40 (which may be, for example, a Hewlett Packard 37701A test set) applied between the transmit and receive lines 36, 38. The test set 40 may apply signals to the lines 36, 38 to run diagnostic tests on the transmission facilities 24 to determine their integrity and to find faults in the system. The test set 40, however, may also be interconnected anywhere else between the transmit and receive lines 36, 38 including, for example, at the first customer premises equipment 34. The test set 40 is shown in the central office 26 in FIG. 1 for purposes of illustration.

Also, for purposes of illustration, only the second repeater 30 is described in greater detail below, although all repeaters or other line elements may also include the address transmission system 20 of the present invention. The repeater 30 includes first and second build-out circuits 42, 44 and a controller 46 interconnected between the transmit and receive lines 36, 38.

The repeater 30 receives an incoming data stream along the transmit line 36 and responsively provides a regenerated signal. During normal operation, the regenerated output from the build-out-circuit 42 is transmitted further along the transmit line 36 to the other repeaters and ultimately to the first customer premises equipment 34.

In other instances, the repeater 30 may be switched, for example, to a loopback mode, where the output of the build-out circuit 42 is redirected back toward the test set 40 in the central office 26 along the receive line 38. In this situation, the test set 40 may apply a signal along the transmit line 36 to test the second repeater 30. Upon receiving substantially the same signal back along the receive line 38, a technician may determine that the lines 22, up to the point where the repeater 30 has "looped back" the test signal, are working correctly. Conversely, a failure to receive the transmitted signal along the receive line 38 (when the first repeater 28, but not the second repeater 30, correctly performed a loop back) suggests that a malfunction in the digital transmission lines 22 exists somewhere between where the signal did loop back in the first repeater 28 and where the signal should have looped back in the second repeater 30.

For purposes of the present description, the portion of the transmit line 36, upon which the build-out circuit 42 receives an incoming data stream, is referred to as the incoming data transmission line. The portion of the cables upon which the output of the build-out circuit 42 is applied, whether it be the rest of the transmit line 36 (between the repeater 30 and the first customer premises equipment 34) or the receive line 38 (between the repeater 30 and the central office 26) shall be referred to as the outgoing data transmission line, and the signal applied to this outgoing data transmission line shall be referred to as the outgoing or repeated data stream.

Figure 2:
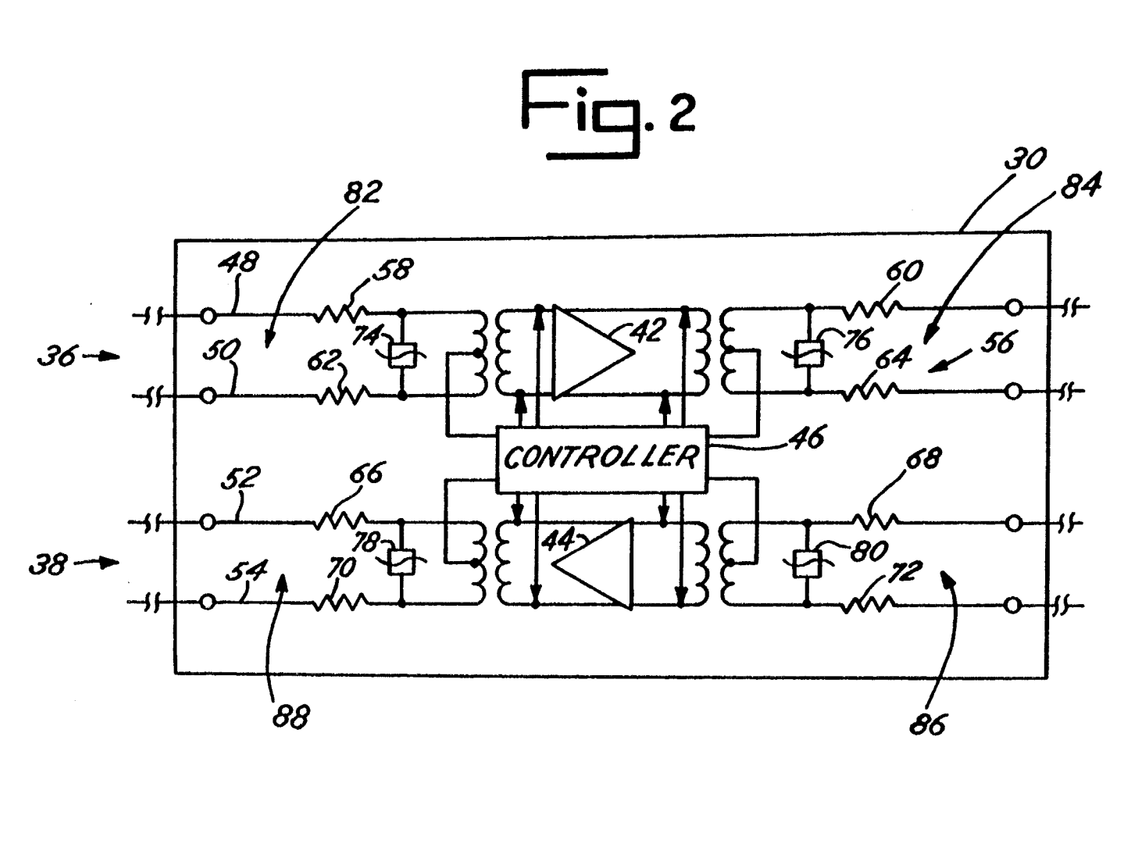
FIG. 2 is a schematic diagram of the repeater shown in FIG. 1.

The second repeater 30 is shown in more detail in FIG. 2. As further explained in Pesetski, the transmit line 36 is identified as first and second cables 48, 50; similarly, the receive line 38 is identified as first and second cables 52, 54. The first build-out circuit 42 is interconnected to the cables 48, 50, and the second build-out circuit 44 is interconnected to the cables 52, 54.

The repeater 30 also includes protection circuitry 56 to limit the damage to the repeater 30 and the transmission lines 22 should the lines 22 be struck by lightning or should power cross occur (where power cables are short-circuited against each other). Such overload protection circuitry 56 includes high wattage, current limiting resistors 58, 60, 62, 64, 66, 68, 70, 72 to limit the amount of current that will pass through a particular line when a high voltage is applied to it. Also, varistors 74, 76, 78, 80 are placed across the cables 48, 50, 52, 54 to again limit the current when a high voltage is accidentally applied.

The repeater 30 divides the cables 48, 50 into first and second spans 82, 84, and the cables 52, 54 into first and second spans 86, 88. The controller 46 is interconnected to all spans 82–88 of the cables 48–54. The controller 46 may include the "intelligence" of the repeater 30, which will allow the repeater 30 to respond to various conditions or signals that the repeater 30 receives, via the transmission lines or other methods. For example, the transmission lines 22 may provide a signal such that the controller 46 will responsively place the repeater 30 in a logical loopback condition, as described below.

Figure 3:
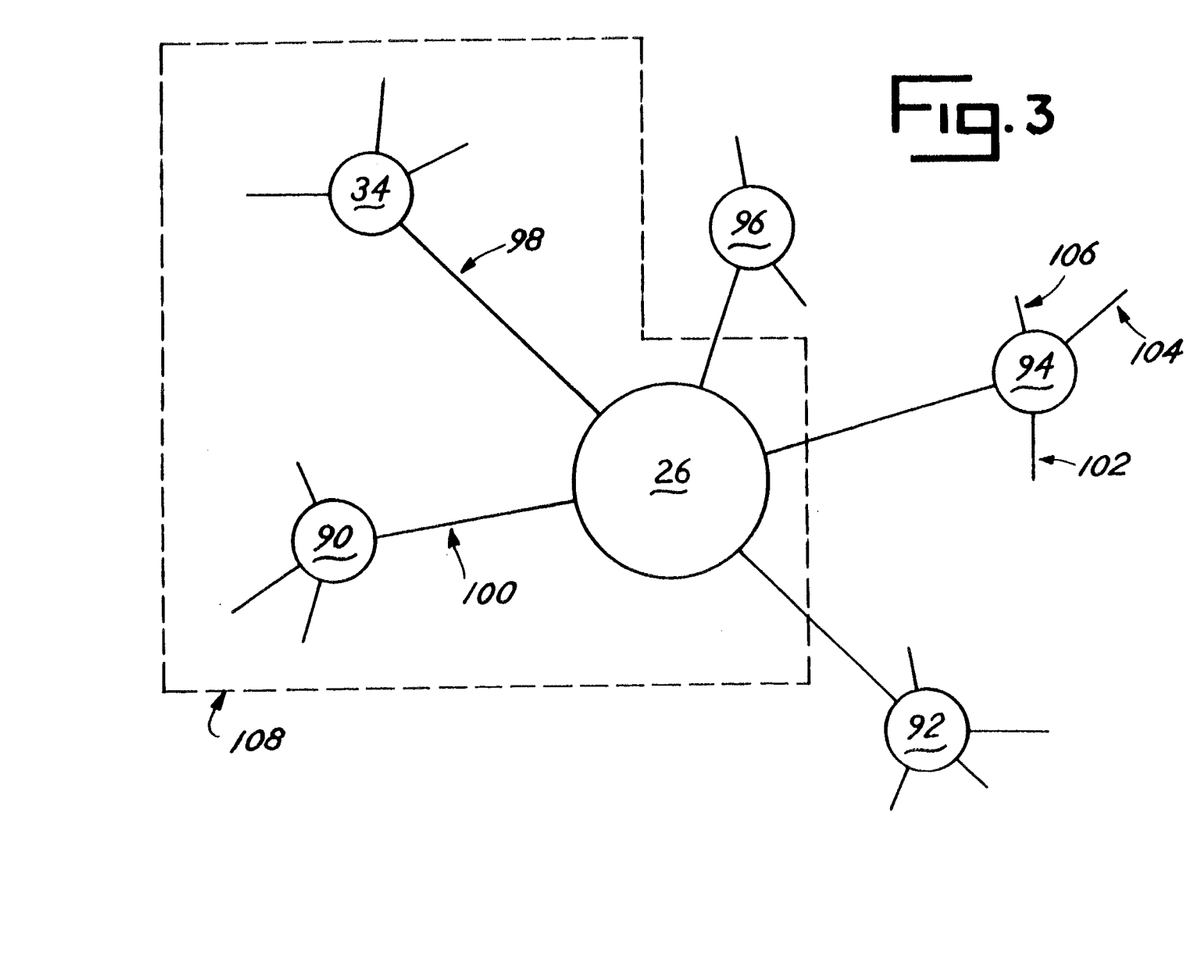
FIG. 3 is a block diagram of a digital transmission line network that employs the present invention.

Referring now to FIG. 3, there is shown a block diagram of digital transmission line network including central office 26 and customer premises 34, each having been illustrated by and previously described with respect to FIG. 1. Further illustrated by way of example in FIG. 3 are additional customer premises equipment 90, 92, 94 and 96, each of which are also connected via a transmission line branch and regenerative repeaters (not shown) to the central office 26. Specifically, for example, customer premises equipment 34 and 90 are connected through branches 98, 100 and repeaters (not shown) to central office 26. Thus, as previously noted, central office 26 serves as a hub to a plurality of transmission line branches and, in turn, to a plurality customer premises equipment. Accordingly, for instance, payload signals may be transmitted from customer premises equipment 34, through the central office 26, to customer premises equipment 90. Customer premises equipment are in turn connected to end-user equipment. Thus, for example, customer premises equipment 94 is connected via cables 102, 104, 106, to customer telephones, computers or other devices.

Figure 4:
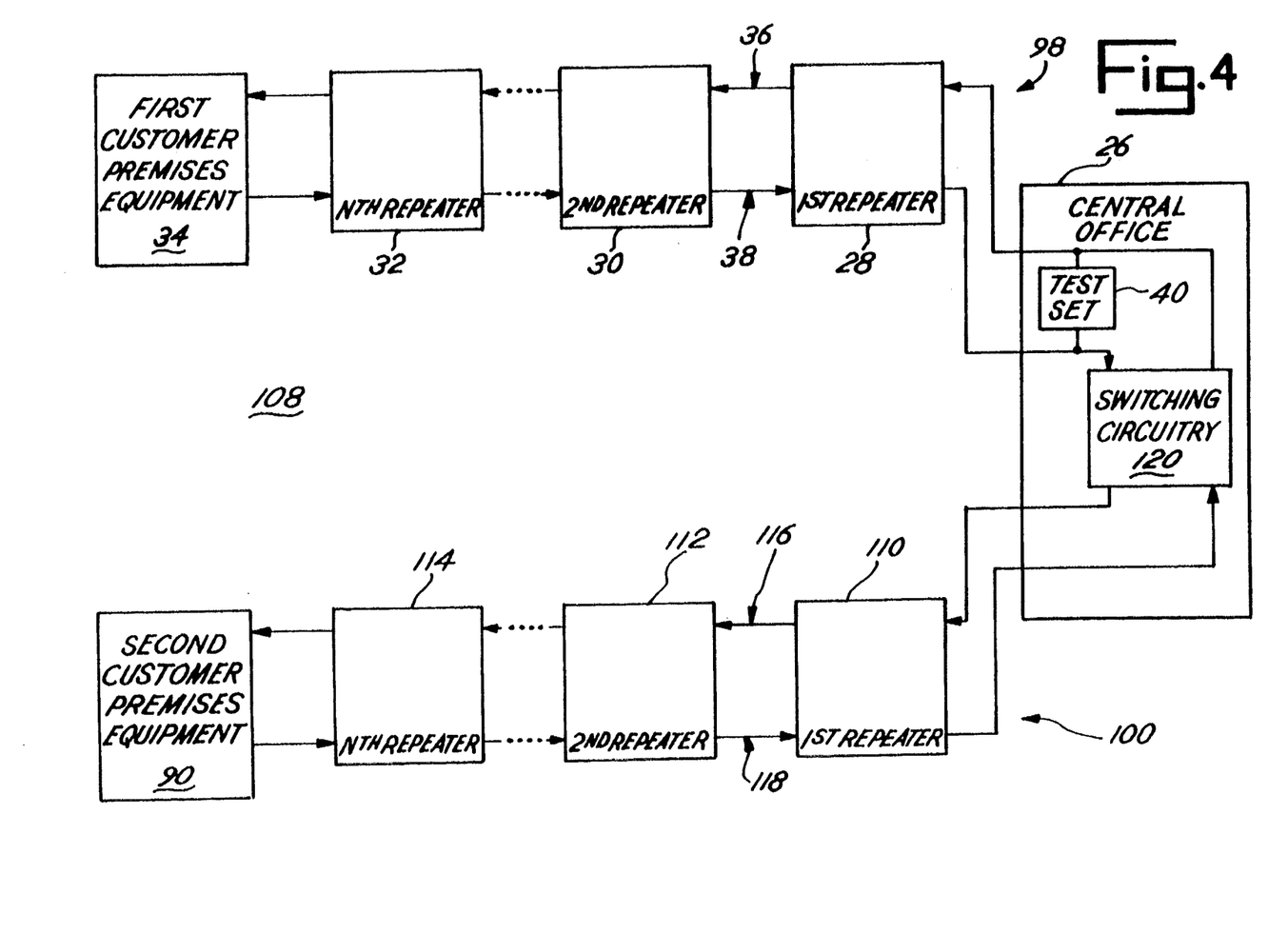
FIG. 4 is a block diagram illustrating in greater detail a portion of the digital transmission line network shown in FIG. 3.

FIG. 4 illustrates in greater detail a block diagram of portion 108 of FIG. 3. Thus, there is shown in FIG. 4 a central office 26 serving as a hub to transmission line branches 98 and 100. A first branch 98 may include the digital transmission facilities illustrated by FIG. 1, as previously described, including the first, second and "Nth" repeaters 28–32 and the first customer premises equipment 34. A second branch 100 may include a second set of digital transmission facilities such as repeaters 110–114 and second customer premises equipment 90, connected by spans of transmission lines including cables 116 and cables 118 (referred to respectively for convenience as transmit and receive lines). The central office 26 contains switching circuitry 120 that may determine and control the transmission of payload data from one branch to another and accordingly from one set of customer premises equipment to another.

Along each digital transmission line branch, line elements such as the regenerative repeaters 28–32 and 110–114 are each identified by a unique address, which, in the preferred embodiment, may take the form of a 16-bit binary code, designed to distinguish each line element from others along the given branch. Thus, as an example, the first repeater 28 in transmission branch 98 might be identified by a 16-bit binary code corresponding to the number 11, the second repeater 30 by a binary code corresponding to the number 12, and the Nth repeater 32 by a binary code corresponding to the number "1N". Similarly, the first repeater in transmission line branch 100 might be identified by a binary code corresponding to the number 21, and so forth.

As described above, it may sometimes be necessary to determine the location of a fault in the digital transmission line network. To make this determination, a test set 40 may be connected between the transmission lines in the central office (or in any other line element), as shown in FIGS. 1 and 3, and line elements downstream may selectively be placed in loopback mode.

In order to control the selective placement of line elements in loopback mode, however, a communication system must exist between the test set 40 and the line elements. For example, if a technician at test set 40 in central office 26 wishes to cause the second repeater 30 in the first transmission branch 98 to enter loopback (repeater 30 being referred to as the selected line element), the test set 40 must be able to communicate with repeater 30. As previously noted, such communication system may involve the following three steps, with reference to FIG. 4.

First, the test set 40 transmits downstream (along transmit line 36) an "arm" code, which causes the line elements along the branch to scan the continuous data stream for a loopup code. In many systems, a loopup code is, in part, the binary address of the line element targeted to enter loopback.

Second, the test set 40 activates loopback in the selected line element by transmitting along the transmit line 36 a loopup code, which, in this example, is the 16-bit address of repeater 30. In the preferred embodiment, in order to ensure that the address of repeater 30, rather than noise, is being transmitted on the transmit line 36 (and to thereby avoid interference from noise), the loopup code generated by the test set may comprise three seconds of the address of the repeater 30.

Third, the selected line element, i.e., repeater 30, confirms that it is about to enter loopback mode, by transmitting an acknowledgement code along the receive line 38 back to the test set 40. This acknowledgment code may comprise the address of repeater 30. In the preferred embodiment, however, again in order to avoid noise interference, the acknowledgement code transmitted by repeater 30 along the receive line back to the test set may comprise two seconds of the above-described address of repeater 30. Following this procedure, repeater 30 would enter loopback mode, looping back data from the transmit line 36 to the receive line 38.

Unfortunately, in some systems, the selected line element on a given transmission line branch may have the same binary address as a line element on another transmission line branch. For instance, in the present example, it is possible that repeater 30 in the first transmission line branch may have the same binary address as repeater 112 in the second transmission line branch. As an undesired result, when the above communication procedure is applied to place repeater 30 in loopback mode, it is possible that repeater 112 may enter loopback mode as well. More specifically, when repeater 30 transmits its binary address back to the test set 40 via receive line 38 to confirm that repeater 30 is about to enter loopback mode, the binary address may continue along transmit line 116 (as shown in FIG. 4) and reach repeater 112. If repeater 112 is armed, repeater 112 may interpret the transmission of "its" address as a command to enter loopback, and repeater 112 will accordingly enter loopback as well.

The present invention avoids this undesired result by including an inverter or an inversion function in the control system of the line elements along each of the transmission line branches, as well as an interpreter or a reciprocal inverter or inversion function in the test set 40. In order for a line element to acknowledge its receipt of a loopup code, the line element may thereby invert its binary address and transmit its inverted address along the receive line to the test set 40. This may also be referred to as transmitting an "inversion" of its binary address.

The test set 40, in turn, scans the incoming data stream for the inverted address of the targeted line element in order to ensure that the appropriate line element has entered loopback mode. In particular, the test set may either scan the incoming data for the inverted address as an acknowledgment signal, or invert the incoming data and scan the inverted incoming data for the non-inverted address as an acknowledgement signal. In either case, another line element bearing the same binary address as the targeted line element will accordingly not detect its address in the continuous stream of data and will not view the transmission as a command to enter loopback.

Further, assume that the repeater 30 has been instructed to enter the loopback mode, but that the repeater 28 mistakenly enters into the loopback mode instead or that the lines 36 cross between the central office 26 and repeater 30. The test set 40 will recognize that, instead of receiving the inverted address of the repeater 30, it is simply receiving the same non-inverted address of the repeater 30 and, thus, that the desired loopback has not been accomplished.

In the preferred embodiment of the present invention, as discussed, the effects of stray noise along the transmission lines 22 are reduced by transmitting (whether as a loopup code or an acknowledgement code) the address of the selected line element for several seconds. In order to help ensure that the address of only the selected line element appears in the transmitted data stream, however, the system of the present invention ensures that no two line elements could be activated by the same test set. This is true, even when one of the addresses is (1) rotated or (2) rotated and inverted.

For purposes of illustrating concepts of the present invention, the use of an 8-bit address for the line elements along any given transmission line branch is assumed. In such a case, using the present invention, the binary addresses of line elements should only be selected from those addresses shown below having an asterisk next to them. That is, the selected line element addresses should both be unique under rotation and have a unique complement.

| No. | Code | No. | Complement |
|---|---|---|---|
| *1 | 0 0 0 0 0 0 0 0 | 36 | 1 1 1 1 1 1 1 1 |
| *2 | 0 0 0 0 0 0 0 1 | 35 | 1 1 1 1 1 1 1 0 |
| *3 | 0 0 0 0 0 0 1 1 | 28 | 1 1 1 1 1 1 0 0 |
| *4 | 0 0 0 0 0 1 0 1 | 32 | 1 1 1 1 1 0 1 0 |
| *5 | 0 0 0 0 0 1 1 1 | 17 | 1 1 1 1 1 0 0 0 |
| *6 | 0 0 0 0 1 0 0 1 | 33 | 1 1 1 1 0 1 1 0 |
| *7 | 0 0 0 0 1 0 1 1 | 27 | 1 1 1 1 0 1 0 0 |
| *8 | 0 0 0 0 1 1 0 1 | 22 | 1 1 1 1 0 0 1 0 |
| 9 | 0 0 0 0 1 1 1 1 | 9 | 1 1 1 1 0 0 0 0 |
| *10 | 0 0 0 1 0 0 0 1 | 34 | 1 1 1 0 1 1 1 0 |
| *11 | 0 0 0 1 0 0 1 1 | 26 | 1 1 1 0 1 1 0 0 |
| *12 | 0 0 0 1 0 1 0 1 | 30 | 1 1 1 0 1 0 1 0 |
| *13 | 0 0 0 1 0 1 1 1 | 16 | 1 1 1 0 1 0 0 0 |
| *14 | 0 0 0 1 1 0 0 1 | 25 | 1 1 1 0 0 1 1 0 |
| *15 | 0 0 0 1 1 0 1 1 | 19 | 1 1 1 0 0 1 0 0 |
| 16 | 0 0 0 1 1 1 0 1 | 13 | 1 1 1 0 0 0 1 0 |
| 17 | 0 0 0 1 1 1 1 1 | 5 | 1 1 1 0 0 0 0 0 |
| *18 | 0 0 1 0 0 1 0 1 | 31 | 1 1 0 1 1 0 1 0 |
| 19 | 0 0 1 0 0 1 1 1 | 15 | 1 1 0 1 1 0 0 0 |
| *20 | 0 0 1 0 1 0 1 1 | 24 | 1 1 0 1 0 1 0 0 |
| 21 | 0 0 1 0 1 1 0 1 | 21 | 1 1 0 1 0 0 1 0 |
| 22 | 0 0 1 0 1 1 1 1 | 8 | 1 1 0 1 0 0 0 0 |
| 23 | 0 0 1 1 0 0 1 1 | 23 | 1 1 0 0 1 1 0 0 |
| 24 | 0 0 1 1 0 1 0 1 | 20 | 1 1 0 0 1 0 1 0 |
| 25 | 0 0 1 1 0 1 1 1 | 14 | 1 1 0 0 1 0 0 0 |
| 26 | 0 0 1 1 1 0 1 1 | 11 | 1 1 0 0 0 1 0 0 |
| 27 | 0 0 1 1 1 1 0 1 | 7 | 1 1 0 0 0 0 1 0 |
| 28 | 0 0 1 1 1 1 1 1 | 3 | 1 1 0 0 0 0 0 0 |
| 29 | 0 1 0 1 0 1 0 1 | 29 | 1 0 1 0 1 0 1 0 |
| 30 | 0 1 0 1 0 1 1 1 | 12 | 1 0 1 0 1 0 0 0 |
| 31 | 0 1 0 1 1 0 1 1 | 18 | 1 0 1 0 0 1 0 0 |
| 32 | 0 1 0 1 1 1 1 1 | 4 | 1 0 1 0 0 0 0 0 |
| 33 | 0 1 1 0 1 1 1 1 | 6 | 1 0 0 1 0 0 0 0 |
| 34 | 0 1 1 1 0 1 1 1 | 10 | 1 0 0 0 1 0 0 0 |
| 35 | 0 1 1 1 1 1 1 1 | 2 | 1 0 0 0 0 0 0 0 |
| 36 | 1 1 1 1 1 1 1 1 | 1 | 0 0 0 0 0 0 0 0 |

*Codes that are both "unique under rotation" and have a unique complement (with respect to the addresses, or codes, of other line elements.

Note that with the 8-bit codes, there are a total of 256 total combinations. Under the selection rules discussed above, only 36 of the combinations are unique under rotation, and only 16 are useable, since they are both unique under rotation and have a unique complement.

Figure 5:
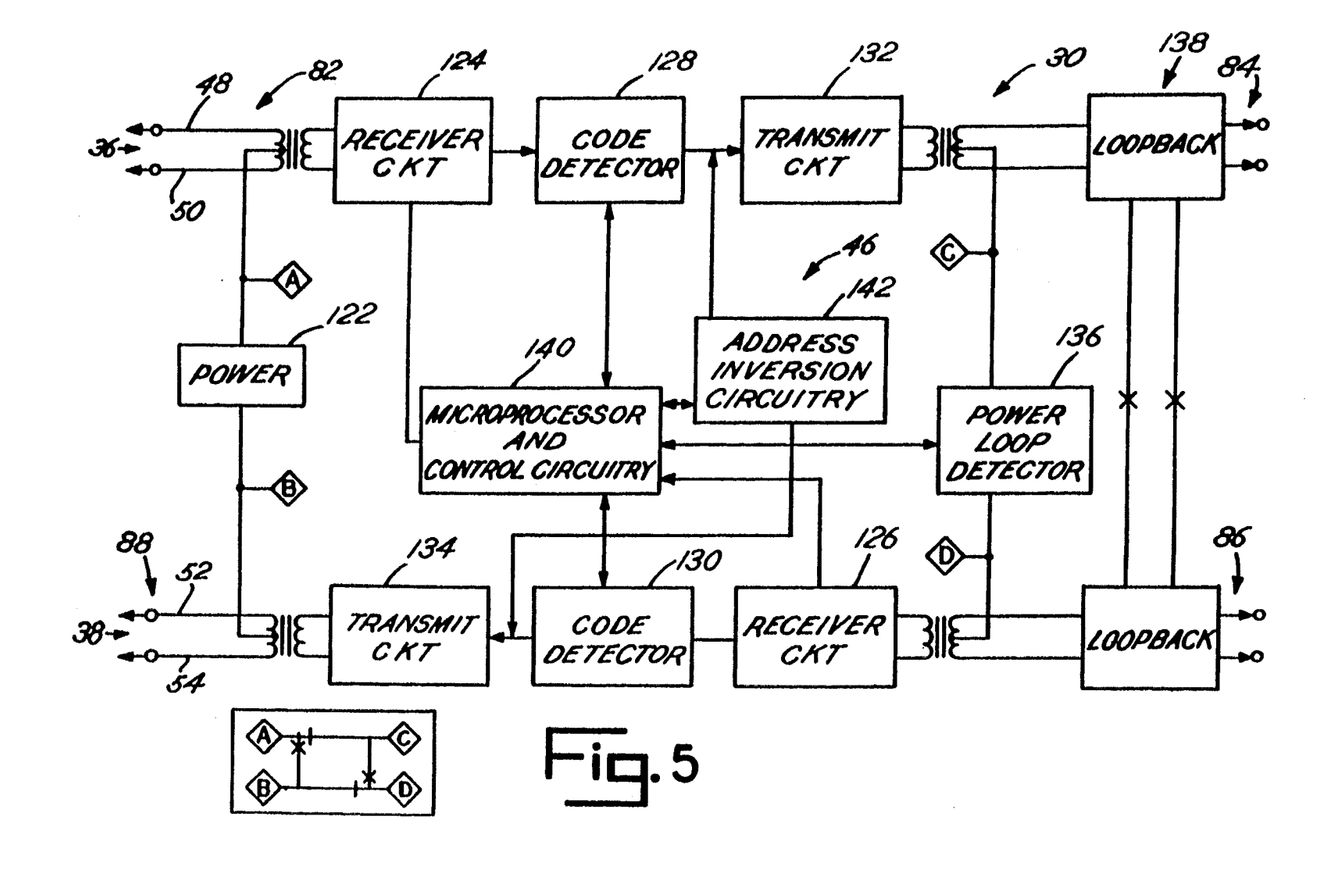
FIG. 5 is a detailed block diagram of the repeater shown in FIG. 2.

A similar list may be easily generated by those of ordinary skill in the art for 16-bit addresses. FIG. 5 illustrates in greater detail a block diagram of the repeater shown in FIG. 2, including the address inversion circuitry contemplated by the present invention. Specifically, in FIG. 5, the repeater 30 is shown as a microprocessor-based system having the controller 46, a power supply 122, receiver circuitry 124, 126, code detector circuitry 128, 130, transmit circuitry 132, 134, a power loop detector 136, and loopback circuitry 138. The controller 46 includes microprocessor 140 and address inversion circuitry 142.

Thus, referring to FIG. 5, the operation of the elements associated with the transmit line 36 are explained for purposes of illustration. While in a normal transmission mode, the payload is applied to the first span 82 and is sensed by the receiver circuitry 124. The receiver circuitry 124 forwards the signal to the code detector 128, which senses, for example, whether a loopup code exists in the incoming data stream. If not, the transmit circuitry 132 then regenerates the signal and applies it to the second span 84 of the transmit line 36.

The power loop detector 136 may sense an open transmission path on the spans between the second repeater 30 and the customer premises equipment 34. If this happens, the detector 136 signals the microprocessor 140, which, in turn, causes the loopback circuitry 138 to loopback power, thus keeping the repeater in a powered state.

If the code detector 128, in conjunction with the microprocessor 140, detects a loopup code in the incoming data stream, the repeater 30 must then acknowledge that it received a loopup code and that it is about to enter loopback mode. In the preferred embodiment of the present invention, microprocessor 140, in conjunction with address inversion circuitry 142, will therefore invert the address of repeater 30 and cause the inverted address to be introduced, through transmit circuitry 134 into the outgoing data stream along receive line 38.

The address inversion circuitry 142 may consist of a simple inverter, which may be activated by the microprocessor 140. Alternatively, the circuitry 142 may be incorporated into the microprocessor hardware and/or software. In another embodiment of the present invention, when in loopback mode, the microprocessor 140 directly repeats signals from line 36 along the line 38, and simply inverts such a signal without the need for any such external circuitry 140, 142.

Once repeater 30 has acknowledged its receipt of a loopup code, repeater 30 must then enter loopback mode. Accordingly, the microprocessor 140 applies a signal to the loopback circuitry 138, such that data signals received from the first span 82 are then transmitted, via the loopback circuitry 138, to the receiver circuitry 126 and, ultimately, to the second span 88 of the receive line 38.

Thus, referring again to the above example, once repeater 30 detects a loopup code in the form of its 16-bit binary address in the incoming data stream (along transmit line 36), repeater 30 will thus invert its 16-bit address and transmit the resulting inverted address along receive line 38 back to the test set 40. The test set 40 will either invert the incoming data stream (along receive line 38) and scan for the address of repeater 30, or simply scan the incoming data stream for the inverted address of repeater 30, thereby confirming that the selected line element (repeater 30) will appropriately enter loopback. Assuming again that repeaters 30 and 112 have the same binary address, the inverted address of repeater 30 will not be the same as the non-inverted address of repeater 112. Therefore, should the inverted address of repeater 30 continue along transmit line 116 from the central office 26 to repeater 112, repeater 112 will not interpret the transmitted signal as a loopup command and will accordingly not enter loopback.

A preferred embodiment of the present invention has been described herein. It is to be understood, of course, that changes and modifications may be made in the embodiments shown without departing from the true scope and spirit of the present invention, as defined by the appended claims.

We claim:

1. A maintenance communication system for enabling a test set interconnected to transmission lines in a digital telecommunication network to communicate with a remote line element interconnected to said transmission lines, said remote line element defining a binary address, said maintenance communication system comprising in combination:
   activation means for transmitting a loopup code from said test set to said remote line element;
   inversion means for responsively inverting said binary address of said remote line element, thereby generating an inversion of said binary address; and
   acknowledgement means for transmitting an acknowledgement code from said remote line element to said test set, said acknowledgement code comprising said inversion of said binary address.

2. A maintenance communication system as claimed in claim 1, wherein said loopup code comprises said binary address of said remote line element.

3. A maintenance communication system as claimed in claim 1, wherein said acknowledgement code comprises an inversion of said binary address.

4. An address acknowledgment system for enabling a first line element interconnected to a first digital transmission line in a telecommunication network to communicate with a remote facility interconnected to said network, the digital transmission line carrying an incoming data stream and an outgoing data stream, and the line element defining an address, the system comprising, in combination:
   means for introducing into said outgoing data stream an inversion of said address; and
   means at said remote facility for receiving the inversion of said address and for interpreting the inversion of said address as an acknowledgement.

5. An address acknowledgement system as claimed in claim 4, wherein said means at said remote facility for receiving the inversion of said address and for interpreting the inversion of said address as an acknowledgment comprise means for reversing the inversion of said address.

6. An improvement in a digital transmission line network having digital transmission lines interconnecting at least a first line element, a second line element and a remote facility, said first line element defining an address, said first line element arranged and configured to communicate said address along said transmission lines to said remote facility, said second line element being receptive and responsive to said address communicated along said transmission lines, said improvement comprising:
   means for inverting the address of said first line element and transmitting an inversion of said address along said transmission lines to said remote facility; and means
   means for detecting and interpreting said inversion of said address at said remote facility.

7. A maintenance communication system for a line element interconnected to a digital transmission line, the digital transmission line carrying an incoming data stream and an outgoing data stream, and the line element defining an address, the system comprising, in combination:
   a repeater for receiving the incoming data stream along the digital transmission line and for passing a repeated data stream along the outgoing transmission line; and a first controller at said repeater for (i) detecting a maintenance code in the incoming data stream, and responsively (ii) inverting the address of said line element and (iii) introducing the inverted address of the line element into the outgoing data stream.

8. A maintenance communication system as claimed in claim 7, wherein said maintenance code is a loopup code.

9. A maintenance communication system as claimed in claim 7, further comprising a remote facility interconnected to said digital transmission line for receiving and interpreting the inverted address of said repeater.

10. A repeater interconnected to incoming and outgoing digital transmission lines, said incoming transmission line carrying an incoming data stream and said repeater defining an address, said repeater comprising, in combination:
   a build-out circuit for receiving said incoming data stream along said incoming transmission line and producing a repeated data stream along said outgoing digital transmission line;
   a detector for sensing a maintenance code in said incoming data stream; and
   a controller for responsively inverting the address of said repeater and for introducing said inverted address into said repeated data stream.

11. A repeater as claimed in claim 10, wherein said maintenance code is a loopup code.

12. A remote communication system for a line element interconnected to a digital transmission line, said digital transmission line carrying an incoming data stream and an outgoing data stream, and said line element defining an address, said system comprising, in combination:
   a repeater for receiving said incoming data stream along said digital transmission line and passing a repeated data stream to said outgoing transmission line;
   an inverter for inverting the address of said line element; and
   a means for introducing the inverted address into said repeated data stream.

13. A method for enabling maintenance communication by a line element interconnected to a digital transmission line, said digital transmission line carrying a stream of coded data, said element defining an address, said method comprising the steps of:
   detecting a maintenance code; and
   introducing a responsive communication signal into said stream of coded data, said responsive communication signal comprising an inversion of said address.

14. A method as claimed in claim 13 wherein said maintenance code is a loopup request.

15. A program storage device readable by a machine, tangibly embodying a program of instructions executable by the machine to perform the method steps of claim 13.

16. A method of transmitting a unique acknowledgement from a transmission line element to a remote location along a digital transmission line carrying an incoming stream of coded data to said transmission line element, said transmission line element defining an address, said method comprising the following steps:
   producing a repeated data stream in response to said incoming data stream;
   inverting the address of said transmission line element; and
   introducing the inverted address of said transmission line element into said repeated data stream.

17. A program storage device readable by a machine, tangibly embodying a program of instructions executable by a machine to perform the method steps of claim 16.

18. A method of communicating a unique acknowledgement from a transmission line element to a remote location along a digital transmission network, said digital transmission network carrying to said transmission line element an incoming stream of coded data, and said digital transmission network carrying from said transmission line element to said remote location an outgoing stream of coded data, said transmission line element defining an address, said method comprising the steps of:
   inverting the address of said transmission line element;
   introducing the inverted address of said transmission line element into said outgoing data stream; and
   reciprocally inverting the inverted address of said transmission line element.

19. A program storage device readable by a machine, tangibly embodying a program of instructions executable by the machine to perform the method steps of claim 18.

20. A method as claimed in claim 18, wherein the step of inverting the address of said transmission line element is performed at said transmission line element.

21. A method as claimed in claim 18, wherein the step of reciprocally inverting the inverted address of said transmission line element is performed at said remote location.

* * * * *